United States Patent
Longshaw et al.

[15] 3,687,167
[45] Aug. 29, 1972

[54] BEADED PLASTIC TUBING JOINT AND FABRICATION

[72] Inventors: William J. Longshaw, Whittier; Roy C. Sieson, Jr., Santa Paula; James Ridenour, Huntington Beach, all of Calif.

[73] Assignee: Pacific Western Extruded Products, Inc., Downey, Calif.

[22] Filed: Sept. 4, 1970

[21] Appl. No.: 69,995

Related U.S. Application Data

[60] Division of Ser. No. 746,459, July 22, 1968, Pat. No. 3,557,275, which is a continuation-in-part of Ser. No. 555,153, Jan. 3, 1966, Pat. No. 3,494,643.

[52] U.S. Cl..................................138/109, 138/148
[51] Int. Cl...................................................F16l 9/00
[58] Field of Search.........138/109, 89, 96, 96 T, 148

[56] References Cited

UNITED STATES PATENTS

| | | | |
|---|---|---|---|
| 3,098,664 | 7/1963 | Waugh | 138/109 X |
| 3,318,334 | 5/1967 | Fuzzell | 138/109 |
| 2,800,344 | 7/1957 | Wolcott | 138/109 X |
| 3,418,409 | 12/1968 | Hesse et al. | 138/109 X |
| 2,732,864 | 1/1956 | Stansbury | 138/96 T |

*Primary Examiner*—Herbert F. Ross
*Attorney*—White and Haefliger

[57] ABSTRACT

The disclosure concerns a method of forming a rigid plastic tube with an end portion that loops outwardly, reversely and inwardly to form a resiliently deformable hollow annular bead. Also, formation of a double walled plastic tube is described.

4 Claims, 11 Drawing Figures

PATENTED AUG 29 1972 3,687,167
SHEET 1 OF 3
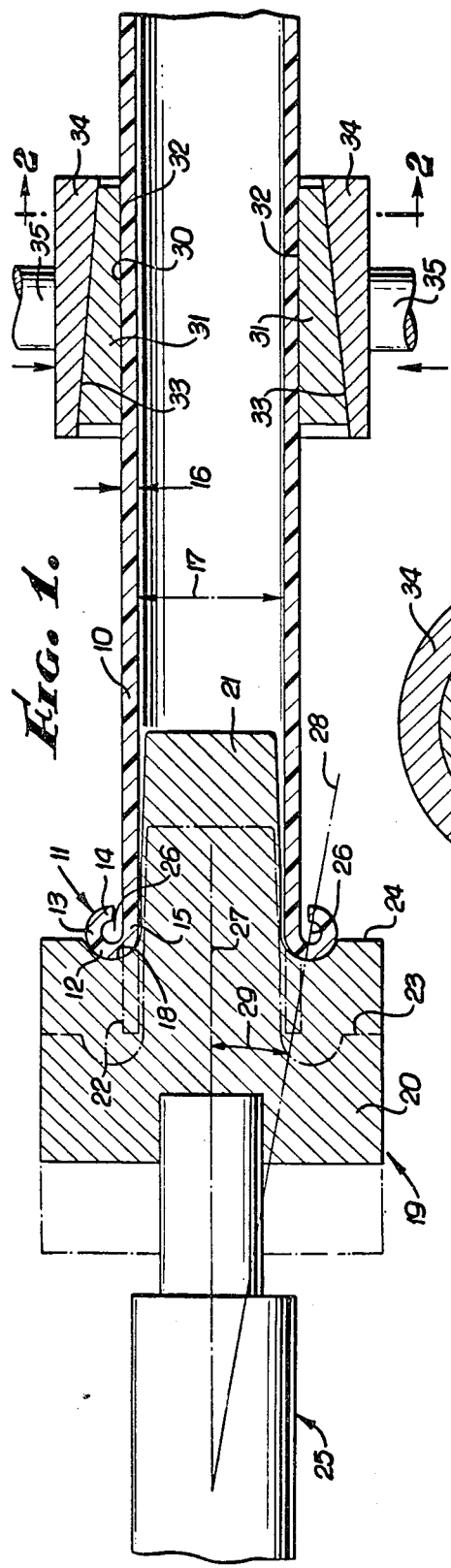
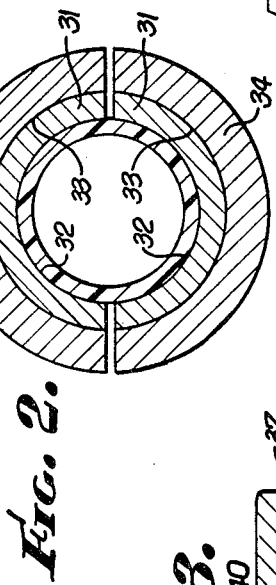
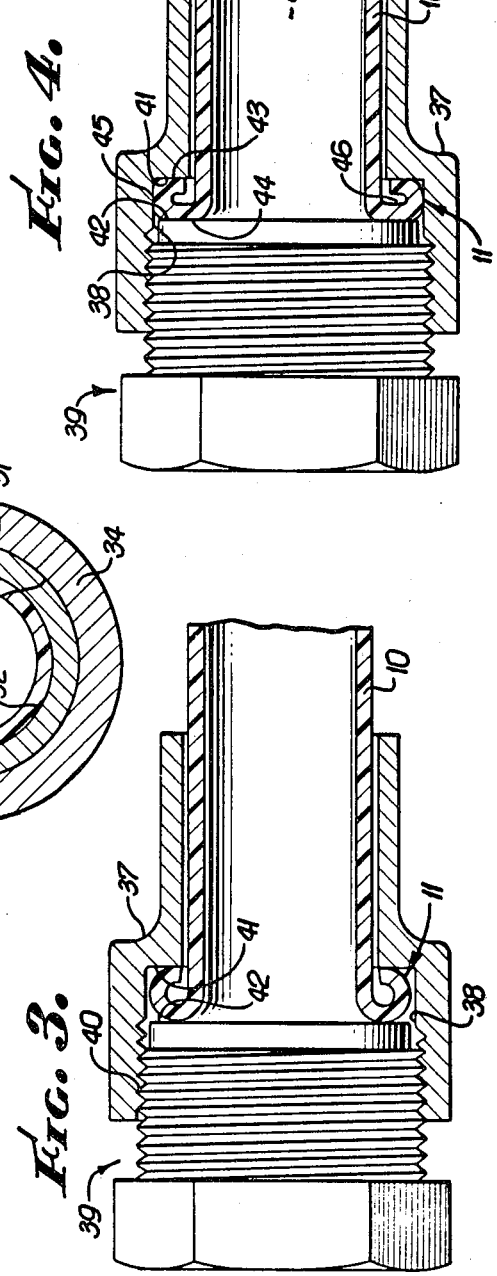
INVENTORS.
WILLIAM J. LONGSHAW
ROY C. WILSON, JR.
JAMES M. RIDENOUR
By White & Haefliger
ATTORNEYS.

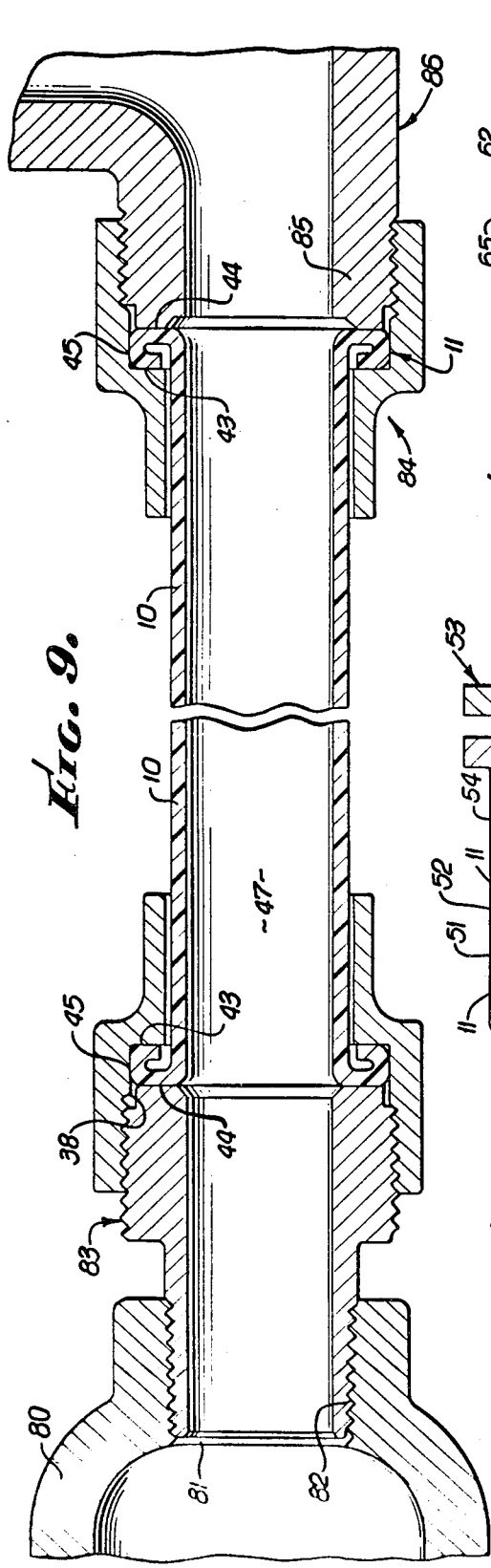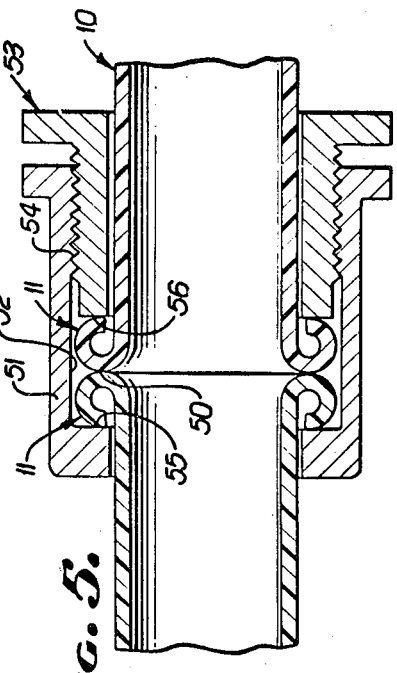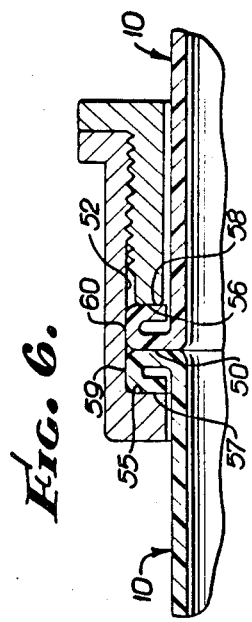

PATENTED AUG 29 1972

INVENTORS.
WILLIAM J. LONGSHAW
ROY C. WILSON, JR.
JAMES M. RIDENOUR
By White & Haefliger
ATTORNEYS.

BEADED PLASTIC TUBING JOINT AND FABRICATION

This application is a division of application Ser. No. 746,459 filed July 22, 1968, now U.S. Pat. No. 3,557,275, which was a continuation-in-part of application Ser. No. 555,153, filed Jan. 3, 1966, now U.S. Pat. No. 3,494,643.

This invention relates generally to plastic tubing and pipe, and more particularly concerns the formation and provision of plastic tubing with improved integral end beading imparting multiple sealing effects in pipe joints, and enabling highly reliable use of plastic tubing in pressurized water supply systems. This application is a division of application Ser. No. 746,459 which is a continuation-in-part of our earlier application, Ser. No. 555,153, filed June 3, 1966.

While plastic pipe has been proposed for use in pressurized water supply systems, such proposals have not been considered as entirely acceptable for reasons that include assembly and sealing difficulties at pipe joints. In this regard, no one to our knowledge has been able to provide a plastic tubing system incorporating plastic tubing and joints having the unusually desirable features of the present invention, as will appear.

It is a major object of the present invention to provide a forwardly endwise extending relatively rigid plastic tube having a generally toroidal forward end portion looping outwardly, endwise reversely and then inwardly toward the tubing wall thereby to form an annular bead, together with means confining the bead in resiliently compressed condition about the tube. Such means may typically have endwise oppositely facing annular shoulders between which the bead is confined in deformed condition to produce tight sealing at multiple locations, and additionally the bead may be received within the bore of a sleeve member against which the resiliently deformed bead additionally seals. As respects a system, two of such tubes are typically oriented so that their end beads extend in end-to-end relation, both beads resiliently annularly compressed and deformed to provide multiple sealing effect against one another as well as against multiple endwise facing shoulders and a confining bore. A series of such tubes may be rapidly assembled and in branching relation to a water main outlet, to provide a highly reliable water supply system as reduced cost. Also, the sealing function of the beads is sufficient to eliminate need for gaskets, the aging of which is a frequent source of leakage.

It is another object of the invention to provide an unusually advantageous method of forming a generally toroidal bead on cold formable plastic tubing the wall thickness of which is typically about 7 to 20 percent of the tubing inner diameter. The method basically involves urging the tubing annular terminal relatively endwise forwardly against a rearwardly openly exposed annular shoulder having concavity to spread deform the terminal outwardly with sharp turn curvature, continuing such urging so that the spread deformed terminal turns inside out, i.e., endwise reversely, free of the shoulder and with looping configuration and then inwardly toward the tubing wall, and thereafter, interrupting such urging. Such cold forming is typically carried out at room temperature, and the tubing may for example consist of impact resistant polyvinylchloride.

It is a still further object of the invention to provide plastic tubing with end beads, for end-to-end connection as described.

Another object is to provide a method of forming an elongated concentric outer tube section of controlled length on a rigid plastic tube, as well as the article itself.

These and other objects and advantages of the invention, as well as the details of an illustrative embodiment, will be more fully understood from the following detailed description of the drawings, in which:

FIG. 1 is a side elevation, taken in section, to show forming of the plastic tubing end bead;

FIG. 2 is a section taken on line 2—2 of FIG. 1;

FIG. 3 is an axial section, taken in elevation to show initial assembly of the tubing end bead in joint structure;

FIG. 4 is a view like FIG. 3 but showing the end bead after confinement to compress and deform the bead creating multiple sealing effect;

FIG. 5 is an axial section taken in elevation to illustrate end-to-end assembly and initial confinement of plastic tubing beads;

FIG. 6 is a view like FIG. 5 but showing the end beads after confinement to compress and deform them creating multiple sealing effect;

FIG. 7 is a fragmentary axial section showing the use of a gasket in conjunction with end-to-end plastic tubing beads;

FIG. 8 is a section taken on line 8—8 of FIG. 7 and showing a typical gasket clamping device;

FIG. 9 shows the use of plastic tubes with end beads in a water supply system;

Figure 10:
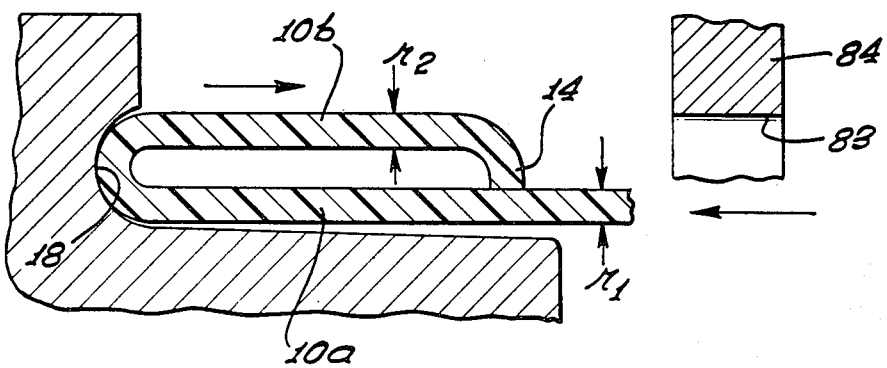
FIG. 10 shows formation of modified tubing in a view like FIG. 1.

Referring first to FIG. 1, the plastic tubing 10 is shown as extending leftwise forwardly, and as having a formed generally toroidal end portion 11 looping outwardly at 12, endwise reversely at 13 and then inwardly at 14 to form an annular bead extending about pipe wall 15. The bead is hollow as shown, to provide utility as will be described. It will also be noted that the tubing typically has wall thickness 16 which is typically about 7 to 20 percent of the tubing inner diameter 17, whereby it is differentiated from very thin wall paper cylinders and the like. A further differentiation is found in the relatively rigid character of the plastic tubing, which may for example consist of impact polyvinylchloride or PVC. One usable material consists of normal impact PVC pipe having a commercial standard designation CS256–63, referring to rigid unplasticized PVC pipe, and being a recorded voluntary standard of the trade published by the U.S. Department of Commerce. Polyethylene plastic is also usable.

FIG. 1 illustrates rearwardly and openly exposed annular shoulder 18 on a mandrel generally designated at 19. The latter has a head portion 20 recessed to form the shoulder 18 and a rearwardly tapered projection 21 over which the tubing 10 is applied during forming of the bead 11. The shoulder 18 has concavity to spread deform the terminal of the tubing, the initial position of which is indicated by the broken lines 22, such spread deformation occurring upon rightward travel of the mandrel from the position indicated by broken lines 23 to the position indicated by solid line 24. In this regard, the tubing terminal 22 is continually urged against the shoulder 18 so that the spread deformed terminal turns endwise reversely as seen at 13 free of the shoulder 18 and with looping configuration, and then turns inwardly toward the tubing wall. Thereafter, the rightward urging of the mandrel is interrupted at the position indicated by the solid line 24. A suitable actuator for the mandrel is generally indicated at 25. It should also be observed that the shoulder 18 in the section seen at FIG. 1 extends throughout a substantially circular arc less than 180°, the center of curvature being indicated at 26 rearwardly of the plane of the mandrel surface 24. As a result, the bead turns endwise reversely free of the shoulder 18 as indicated, for successful formation of the bead. The shoulder 18 may be formed with the mandrel rotated about its axis 27, as on a lathe, with a cutting tool approaching the mandrel along a line 28 extending at an angle 29 of about 10° from the axis 27. During such forming, the tubing is maintained at about room temperature, i.e., between about 60° and 130° F, so the head portion 14 curbs inwardly upon formation.

FIGS. 1 and 2 also show the provision of means to grip the tubing outer surface 30 for holding the tubing during formation of the bead. Such means includes a self-energizing tubing gripper transmitting endwise exerted force to the tubing. The gripper has like jaws 31 with generally circular bore sections 32 applied to the tubing wall. The jaws slidably fit at 33 within platens 34 to which radial force is applied at 35. The rightwardly tapering interfit at 33 provides a self-energizing action whereby as the jaws 31 tend to slip rearwardly with respect to the tubing, they tighten against the tubing to prevent such slippage.

Referring to FIG. 3, a tube 10 having a beaded end portion 11, as previously described, is assembled to means for confining the bead in resiliently compressed condition about the tube. Such means in FIG. 3 includes a sleeve member 37 having a bore 38 receiving the bead 11, and a plug 39 having threaded attachment at 40 to the sleeve member. The sleeve and plug have endwise oppositely facing annular shoulders 41 and 42 which upon tightening of the plug into the sleeve confine the bead in deformed condition between the shoulders as seen in FIG. 4. As a result, the bead is resiliently deformed to have pressure sealing annular engagement at 43 and 44 with the respective shoulders 41 and 42, such engagement creating flats at the bead surfaces engaging the shoulders. In addition, the bead deformation is typically such as to provide pressure sealing annular engagement at 45 with the bore 38. In this regard, it will be noted that the bead hollowness at 46 is substantially reduced. As a result, three annular sealing zones are created for effectively eliminating leakage of fluid from the tubing interior 47, despite pressurization of such fluid as encountered in normal water supply systems, i.e., up to 300 psi, no gasketing being required.

Referring now to FIG. 5, two tubes 10 as previously described are assembled in end-to-end relation with the beads 11 in engagement at 50. The confining means includes the sleeve 51 having a bore 52 into which the beads are received. A tubular plug 53 is threaded into the sleeve at 54, and the sleeve and plug have endwise oppositely facing annular shoulders 55 and 56 between which the beads are confined. Upon tightening of the plug into the sleeve, as indicated in FIG. 6, the beads are axially compressed between the shoulders 55 and 56 to provide annular seals at 57 and 58, the beads being flat at those locations. Furthermore, an annular pressure seal is provided at 50, the locus of engagement of the two beads, this seal also defining surface flats on the beads. Finally, annular seals are produced at 59 and 60, the points of engagement of the beads with the sleeve bore 52. Again, it will be seen that a highly effective joint with multiple seals is provided with a minimum of parts, the assembly of the joint being made extremely simple and rapid by virtue of the construction.

FIGS. 7 and 8 show tubes 10 with beads 11 in end-to-end interengagement, a different form of confining means being provided. The latter includes an annular neoprene gasket 62 extending about the beads in bridging relation therewith and also extending inwardly at opposite ends of the beads, as seen at 63 and 64. In addition, a clamp 65 extends about the gasket in confining relation therewith. FIG. 8 shows the clamp as including sections 65a and 65b pivotally connected at 66, for jaw clamping action about the gasket and beads. A clamp lock 67 includes a member 68 pivoted at 69 to the upper secton 65a. Lock member 70 is pivoted at 71 to the member 68. Member 70 has a projection 72 engageable with the concave lug 73 on the lower secton 65b, and in such manner that as the member 70 is urged in the direction of arrow 74, sections 65a and 65b are clamped about the gasket and retained in clamped condition. As a result, the gasket 62 and beads are held in compressed confined condition with resilient deformation to provide sealing effect at the locus of interengagement 75 of the beads, and also at the locus of interengagement 76 of the gasket and beads.

FIG. 9 illustrates a system incorporating tubes 10 as described. The system includes a main pipe 80 as for example a water main, having a side opening 81 which may be threaded as seen at 82. A tubular plug 83 is threaded into the side opening 81, and may otherwise have the construction of the plug seen at 39 in FIGS. 3 and 4. Accordingly, the joint construction is numbered as in FIGS. 3 and 4, providing for attachment to the plastic tubing 10. A similar construction is seen at the joint location 84 where the tubing 10 attaches to the nipple 85 of a tee 86. The tee may be located at the terminal of the plastic pipe branch made up of several plastic pipes or tubes 10 which may be interconnected as for example is illustrated in FIGS. 5 and 6.

Typical plastic pipes incorporating the invention may have the following dimensions which are illustrative only. Thus much larger pipe diameters are feasible.

| Nominal | O.D. | I.D. | Wall Thickness |
| --- | --- | --- | --- |
| ¾ inch | 1.050 | .824 | 0.113 |
| 1 inch | 1.315 | 1.049 | 0.133 |
| 1¼ inch | 1.660 | 1.380 | 0.140 |
| 1½ inch | 1.900 | 1.610 | 0.145 |
| 2 inch | 2.375 | 2.067 | 0.154 |

Finally, FIG. 10 illustrates the additional step of continuing the urging (indicated by arrow 80) of the tubing 10a toward the mandrel shoulder 18, as described, to bodily displace the inwardly turned terminal 14 axially reversely along the tube 10a. This is accompanied by progressive turning of a substantial lengthwise portion of the tubing inside out to form an axially elongated outer tube section 10b. Note that the thickness $r_z$ of the deformed section 10b is less than the thickness $r_1$ of the undeformed section 10a, and that a plane normal to the tube axis intersects the sections 10a and 10b to define cross-sectioned annuli of approximately equal area. Formation of section 10b with controllable axially elongated extent is facilitated by engagement of in-turned portion 14 with the outer wall of the tube 10a, which blocks further in-turning.

Figure 10A:
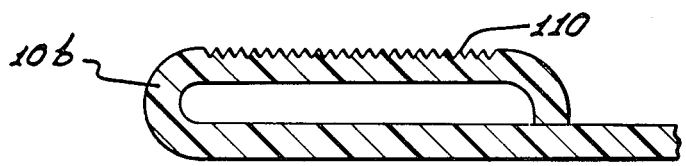
FIG. 10a shows another modified tubing, in section.

As a result, a double-walled tube, the outer wall of which may have any desired length, is easily produced from a simple rigid plastic tube. The double-walled tube section is stiffer and may be made to controlled outer diameter to fit a larger bore 83 of a part 84 as indicated in FIG. 10, whereby an adapter is not needed. Also, as seen in FIG. 10a, outer section 10b may be threaded at 110 to fit a threaded bore in such a part. Further, the tubing is advantageously stiffened as a result of the addition of the outer section 10b.

We claim:

1. A rigid plastic tube comprising an inner tubular section extending axially forwardly, a concentric outer tubular section extending axially reversely and in outwardly spaced relation to the inner section, and an annular bend interconnecting the forwardmost extents of the sections, the bend having U-shape cross sections in axial radial planes, and a plane normal to said axis and intersecting the sections defining inner and outer cross sectional annuli of approximately equal area, said outer section having an annular terminal remote from said bend turned inwardly and engaging the outer surface of the inner section, and there being an axially elongated and closed annular cavity formed by said inner and outer sections, and between said bend and said inwardly turned terminal said outer section having a constant outer diameter between said bend and said annular terminal, and said outer section configured for fitting the bore of a mating tubular member.

2. The tube of claim 1 consisting of impact polyvinylchloride.

3. The tube of claim 1 wherein said outer section defines external threads.

4. The tube of claim 1 wherein said terminal has curvature which is about the same as the curvature of said bend in axial radial planes intersecting the bend and terminal, the radial spacing between said sections being at least about as great as the wall thickness of the inner section.

* * * * *